(12) United States Patent
Ehlers et al.

(10) Patent No.: US 12,223,646 B2
(45) Date of Patent: Feb. 11, 2025

(54) AUTOMATED SELECTION OF ULTRA-WIDEFIELD ANGIOGRAPHY IMAGES

(71) Applicant: THE CLEVELAND CLINIC FOUNDATION, Cleveland, OH (US)

(72) Inventors: Justis P. Ehlers, Cleveland, OH (US); Duriye Damla Sevgi, Cleveland, OH (US); Sunil K. Srivastava, Cleveland, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 465 days.

(21) Appl. No.: 17/734,895

(22) Filed: May 2, 2022

(65) Prior Publication Data
US 2022/0351377 A1 Nov. 3, 2022

Related U.S. Application Data

(60) Provisional application No. 63/182,416, filed on Apr. 30, 2021.

(51) Int. Cl.
*G06T 7/11* (2017.01)
*G06T 7/00* (2017.01)

(52) U.S. Cl.
CPC .............. *G06T 7/0012* (2013.01); *G06T 7/11* (2017.01); *G06T 2207/20081* (2013.01); *G06T 2207/20084* (2013.01); *G06T 2207/30041* (2013.01); *G06T 2207/30101* (2013.01); *G06T 2207/30168* (2013.01)

(58) Field of Classification Search
CPC ...................... G06T 7/0012; G06T 7/11; G06T 2207/20081; G06T 2207/20084; G06T 2207/30041; G06T 2207/30101; G06T 2207/30168

USPC .......................................................... 382/164
See application file for complete search history.

(56) References Cited

U.S. PATENT DOCUMENTS 6,842,638 B1 * 1/2005 Suri ..................... G06T 7/64
600/431

OTHER PUBLICATIONS

Cabrera DeBuc D, Somfai GM, Koller A. Retinal microvascular network alterations: potential biomarkers of cerebrovascular and neural diseases. Am J Physiol Heart Circ Physiol. Feb. 1, 2017;312(2):H201-H212. doi: 10.1152/ajpheart.00201.2016. Epub Dec. 6, 2016. PMID: 27923786; PMCID: PMC5336575.

(Continued)

*Primary Examiner* — Stephen P Coleman
(74) *Attorney, Agent, or Firm* — Tarolli, Sundheim, Covell & Tummino LLP

(57) ABSTRACT

Systems and methods are provided for provided for automated selection of UWFA images. A first set of images representing an early phase of a UWFA image acquisition and a second set of images representing a late phase of the UWFA image acquisition are received and segmented to provide a vascular structure map for each of the first set of images and the second set of images. An image quality metric is assigned to each of the first set of images and the second set of images from the vascular structure map associated with each image. An image of the first set of images having an extreme value for the image quality metric across the first set of images and an image of the second set of images having an extreme value for the image quality metric across the second set of images are selected.

20 Claims, 4 Drawing Sheets

(56) References Cited

OTHER PUBLICATIONS

MacGillivray, T. J., et al. "Retinal imaging as a source of biomarkers for diagnosis, characterization and prognosis of chronic illness or long-term conditions." The British journal of radiology 87.1040 (2014): 20130832.
Poplin R, Varadarajan AV, Blumer K, Liu Y, McConnell MV, Corrado GS, Peng L, Webster DR. Prediction of cardiovascular risk factors from retinal fundus photographs via deep learning. Nat Biomed Eng. Mar. 2018;2(3):158-164. doi: 10.1038/s41551-018-0195-0. Epub Feb. 19, 2018. PMID: 31015713.
Liskowski, Paweł, and Krzysztof Krawiec. "Segmenting retinal blood vessels with deep neural networks." IEEE transactions on medical imaging 35.11 (2016): 2369-2380.
Joonyoung Song, Boreom Lee. Development of automatic retinal vessel segmentation method in fundus images via convolutional neural networks. Annu Int Conf IEEE Eng Med Biol Soc. Jul. 2017;2017:681-684. doi: 10.1109/ EMBC.2017.8036916. PMID: 29059964.
Yin B, Li H, Sheng B, Hou X, Chen Y, Wu W, Li P, Shen R, Bao Y, Jia W. Vessel extraction from non-fluorescein fundus images using orientation-aware detector. Med Image Anal. Dec. 2015;26(1):232-42. doi: 10.1016/j.media.2015.09.002. Epub Sep. 25, 2015. PMID: 26474120.
Manivannan, Ayyakkannu, et al. "Ultra-wide-field fluorescein angiography of the ocular fundus." American journal of ophthalmology 140.3 (2005): 525-527.
Ghasemi Falavarjani K, Wang K, Khadamy J, Sadda SR. Ultra-wide-field imaging in diabetic retinopathy; an overview. J Curr Ophthalmol. Apr. 30, 2016;28(2):57-60. doi: 10.1016/j.joco.2016.04.001. PMID: 27331147; PMCID: PMC4909710.
Ehlers JP, Jiang AC, Boss JD, Hu M, Figueiredo N, Babiuch A, Talcott K, Sharma S, Hach J, Le T, Rogozinski A, Lunasco L, Reese JL, Srivastava SK. Quantitative Ultra-Widefield Angiography and Diabetic Retinopathy Severity: An Assessment of Panretinal Leakage Index, Ischemic Index and Microaneurysm Count. Ophthalmology. Nov. 2019;126 (11):1527-1532. doi: 10.1016/j.ophtha.2019.05.034. Epub Jun. 8, 2019. PMID: 31383482; PMCID: PMC6810836.
Ding, Li, et al. "Quantification of longitudinal changes in retinal vasculature from wide-field fluorescein angiography via a novel registration and change detection approach." 2018 IEEE International Conference on Acoustics, Speech and Signal Processing (ICASSP). IEEE, 2018.
Ding, Li, et al. "Multi-scale morphological analysis for retinal vessel detection in wide-field fluorescein angiography." 2017 IEEE Western New York Image and Signal Processing Workshop (WNYISPW). IEEE, 2017.
Fan, Wenying, et al. "Precise measurement of retinal vascular bed area and density on ultra-wide fluorescein angiography in normal subjects." American journal of ophthalmology 188 (2018): 155-163.
Moosavi, Azam, et al. "Imaging features of vessels and leakage patterns predict extended interval aflibercept dosing using ultra-widefield angiography in retinal vascular disease: Findings from the PERMEATE study." IEEE Transactions on Biomedical Engineering 68.6 (2020): 1777-1786.
Jiang, Alice, et al. "Repeatability of automated leakage quantification and microaneurysm identification utilising an analysis platform for ultra-widefield fluorescein angiography." British Journal of Ophthalmology 104.4 (2020): 500-503.
Ronneberger, Olaf, Philipp Fischer, and Thomas Brox. "U-net: Convolutional networks for biomedical image segmentation." International Conference on Medical image computing and computer-assisted intervention. Springer, Cham, 2015.
Peng, Chao, et al. "Large kernel matters—improve semantic segmentation by global convolutional network." Proceedings of the IEEE conference on computer vision and pattern recognition. 2017.

\* cited by examiner

AUTOMATED SELECTION OF ULTRA-WIDEFIELD ANGIOGRAPHY IMAGES

RELATED APPLICATIONS

This application claims priority to U.S. Provisional Patent Application Ser. No. 63/182,416 ("the '416 application"), filed Apr. 30, 2021 and entitled AUTOMATED SELECTION OF ULTRA-WIDEFIELD ANGIOGRAPHY IMAGES. The entirety of the '416 application is hereby incorporated by reference.

TECHNICAL FIELD

This disclosure relates to medical imaging and, more particularly, to automated selection of ultra-widefield angiography images.

BACKGROUND

Ultra-widefield angiography (UWFA) has unique advantages of visualizing retinal vasculature and flow encircling almost the entire fundus. UWFA can capture up to a two-hundred degree field of view, enabling a more comprehensive disease evaluation. UWFA is an essential tool for posterior segment disorders due to its ability to demonstrate abnormalities within the layers of retina pigment epithelium, sclera, choroid, and optic nerve. Angiographic features such as retinal non-perfusion, leakage, neovascularization, and micro aneurysms are indicators of disease severity. Therefore, quantitative analysis of UWFA carry significant potential for clinical and research application.

SUMMARY

In one example, a system is provided for automated selection of ultra-widefield angiographic (UWFA) images. The system includes a processor and a non-transitory computer readable medium storing executable instructions. The executable instructions include an imager interface that receives a first set of images representing an early phase of a UWFA image acquisition and a second set of images representing a late phase of the UWFA image acquisition. A segmentation component segments each of the first set of images and the second set of images to provide a vascular structure map for each of the first set of images and the second set of images. An image evaluation component assigns an image quality metric to each of the first set of images and the second set of images from the vascular structure map associated with each image. An image selector selects an image of the first set of images having an extreme value for the image quality metric across the first set of images and an image of the second set of images having an extreme value for the image quality metric across the second set of images.

In another example, a method is provided for automated selection of UWFA images. A first set of images representing an early phase of a UWFA image acquisition and a second set of images representing a late phase of the UWFA image acquisition are received and segmented to provide a vascular structure map for each of the first set of images and the second set of images. An image quality metric is assigned to each of the first set of images and the second set of images from the vascular structure map associated with each image. An image of the first set of images having an extreme value for the image quality metric across the first set of images and an image of the second set of images having an extreme value for the image quality metric across the second set of images are selected.

In yet another example, a method is provided for automated selection of UWFA images. A first set of images representing an early phase of a UWFA image acquisition and a second set of images representing a late phase of the UWFA image acquisition are received and segmented to provide a vascular structure map for each of the first set of images and the second set of images. A first image quality metric is assigned to each of the first set of images from the vascular structure map associated with each image. A second image quality metric is assigned to each of the second set of images from the vascular structure map associated with each image. The first image quality metric is calculated differently from the second image quality metric, such that a value of the first image quality metric for a given image is different from a value of the second image quality metric for the given image. An image of the first set of images having an extreme value for the image quality metric across the first set of images is selected. An image of the second set of images having an extreme value for the image quality metric across the second set of images is selected.

DETAILED DESCRIPTION

Figure 1:
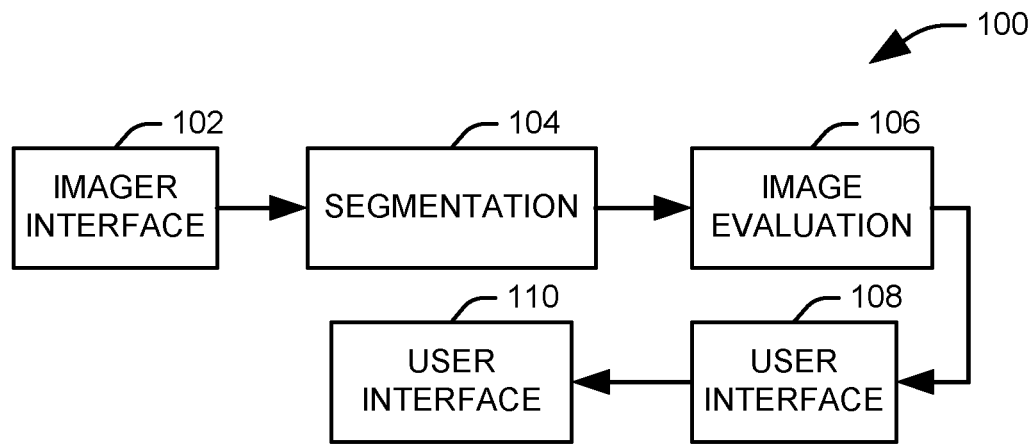
FIG. 1 illustrates a functional block diagram of an example of a system for automated selection of ultra-widefield angiography images.

Retinal vasculature features provide crucial information for the diagnosis and severity assessment of various ophthalmic diseases. Visualization of retinal vessels enables detection of manifestations of systemic conditions such as diabetes mellitus and hypertension. dentification of vascular biomarkers is promising not only for expanding the understanding of pathophysiology but also for introducing new possibilities for personalized treatments by connecting specific pathologic features with optimal treatments. Ultra-widefield fluorescein angiography (UWFA) can capture a two hundred degree field of view (FOV) compared to conventional imaging, which has a thirty to sixty degree FOV, enabling a more comprehensive disease evaluation. As such, UWFA has become an essential tool for posterior segment disorders due this ability to identify near-panretinal abnormalities within the retinal vasculature. Fluorescein angiographic features, such as retinal vascular non-perfusion, leakage and micro aneurysms, are indicators of disease severity. Therefore, quantitative analysis of UWFA images offer significant potential for both clinical and research applications.

One major limitation of UWFA imaging for rapid image assessment is the large number of images that are obtained in a given UWFA session. Often, only a small number of key images are needed for clinician review or automated analysis. Ophthalmologists in clinics and image analysis laboratories manually review the entire set of images to choose the optimal image to assess the angiographic features of interest. Identifying the highest quality phase-specific images requires significant time and may be highly subjective. In addition, media opacities (e.g., vitreous debris, hemorrhage and cataract), lid artifacts, optimal eye-camera distance, sufficient fluorescein dye infusion, injection-to-image time, and centration may impact the image quality.

Typically, in each angiographic study, between twenty and fifty UWFA frames are captured to ensure sufficient quality images are obtained for all phases. Ophthalmologists in clinics and image analysis laboratories manually review the whole set of images to choose the optimal images to assess the angiographic features of interest. This time-consuming process limits workflow significantly. Further, angiographic features are phase sensitive, making phase matching a crucial part of any computational analysis. Phase differences introduce bias in both cross sectional and longitudinal analysis, and manual selection of images introduces subjectivity and may result in sub-optimal image selection for the analysis of phase-sensitive features. Accordingly, the inventors propose an automated arteriovenous and late phase pair selection tool to improving efficiency and reducing variability in UWFA image selection. Specifically, the systems and methods herein utilize a machine learning implemented UWFA vascular segmentation platform to evaluate changes in vascular areas across the 93 entire UWFA sequence in eyes with various underlying pathologies (e.g., normal, diabetic 94 retinopathy (DR) and sickle cell retinopathy (SCR)). The output of this tool is also used for developing an automated quality-optimized phase selection tool for both arteriovenous (i.e., early) and late phase angiograms.

As used herein, a "categorical parameter" is a parameter that can take on any of at least two discrete values representing various categories. An "ordinal categorical parameter" is a categorical parameter in which the discrete values have a natural ranking. One example of an ordinal categorical parameter could be a parameter than can assume the values "good," "better," and "best."

FIG. 1 illustrates a functional block diagram of an example of a system 100 for automated selection of ultra-widefield angiography (UWFA) images. In particular, the illustrated system 100 provides an automated arteriovenous and late phase pair selection tool could be the first step in improving efficiency and reducing variability in image acquisition. The objective and robust image selection provided by the system can significantly improve the speed, consistency, and objectivity of disease burden and activity assessment. In the illustrated example, the system 100 segments each UWFA image to produce a vascular structure map for the image. A metric representing image quality is then generated from the vascular structure map, and one or more images having extreme values for the image quality metric can be selected for each phase of the UWFA image acquisition. It will be appreciated that the system 100 and each component element 102, 104, 106, 108, 110 can be implemented as software instructions executed by an associated processor, dedicated hardware (e.g., an application specific integrated surface or a field programmable gate array), or a combination of software instructions and dedicated hardware The system 100 includes an imager interface 102 that receives a sequence of UWFA images from an UWFA imaging device. It will be appreciated that the UWFA imaging device can comprise any retinal imaging camera capable of capturing ultra-widefield images. In one example, early phase images, as the phase is used herein, are images acquired during the arteriovenous phase of the angiographic imaging. The arteriovenous phase is characterized by complete filling of the retinal capillary bed and the retinal veins beginning to fill with fluorescein. In the early arteriovenous phase, thin columns of fluorescein are visualized along the walls of the larger veins, and these columns become wider as the entire lumen fills with dye. The arteriovenous phase typically occurs between ten and ninety seconds after injection of the dye. The late phase can include any images taken after a predetermined time period after injection. In one example, the late phase begins at four minutes after injection.

A segmentation component 104 that generates a vascular structure map from each UWFA image in the sequence. The segmentation component 104 can segment the images via any appropriate segmentation technique, including, for example, region growing techniques, watershed techniques, deformable model/energy minimization techniques, Markov random field models, clustering-based techniques, graph cut techniques, neural networks, and hybrids of these various approaches. In one implementation, the segmentation component 104 includes a convolutional neural network, trained on images segmented by human experts, that generates vascular structure maps from UWFA images. In one implementation, a network with eighteen convolutional layers is used along with a 12×12 kernel, which allows for more contextual information to be applied in the segmentation.

An image evaluation component 106 generates a metric representing the quality of each UWFA image based on the vascular structure map. Using this metric, one or more highest quality images can be selected for each phase of the UWFA acquisition process at an image selector 108. It will be appreciated that the image quality metric can be a continuous parameter, in which case the threshold can be a numerical value, or a categorical parameter, with a series of categorical grades having an ordinal ranking. In practice, to distinguish among the relatively large number of images in each phase, a continuous parameter or a categorical parameter that can assume any of a large number of discrete values will generally be used. In some implementations, however, other properties of the image (e.g., ordinal position within the phase) can be used to select among equally graded images, and thus a categorical parameter that defines an acceptable image quality can be used and a representative image can be selected from the acceptable candidates according to these other properties. Where the metric is a continuous parameter, it will be appreciated that either high values of the metric or low values of the metric can represent high quality images, depending on how the metric is calculated.

In one example, the image evaluation component 106 can utilize one or more predictive models, implemented, for example, as classification and regression models, each of which analyze provided data to assign an image quality metric to each image. Where multiple classification and regression models are used, the image evaluation component 106 can include an arbitration element can be utilized to provide a coherent result from the various algorithms. Depending on the outputs of the various models, the arbitration element can simply select a class from a model having a highest confidence, select a plurality of classes from all models meeting a threshold confidence, select a class via a voting process among the models, or assign a numerical parameter based on the outputs of the multiple models. Alternatively, the arbitration element can itself be implemented as a classification model that receives the outputs of the other models as features and generates one or more output classes for the patient.

In this implementation, image evaluation component 106, as well as any constituent models, can be trained on training data representing training images, specifically segmented vascular structure maps. For example, in supervised learning models, a set of example vascular structure maps having labels representing the image quality can be used to train the image evaluation component 106, either by directly providing the vascular structure maps as inputs or by extracting numerical feature data from the vascular structure maps, such as the total area of the map or the vascular area within various subregions of the map. The training process of the image evaluation component 106 will vary with its implementation, but training generally involves a statistical aggregation of training data into one or more parameters associated with the output classes. For rule-based models, such as decision trees, domain knowledge, for example, as provided by one or more human experts, can be used in place of or to supplement training data in selecting rules for classifying a user using the extracted features. Any of a variety of techniques can be utilized for the models, including support vector machines, regression models, self-organized maps, k-nearest neighbor classification or regression, fuzzy logic systems, data fusion processes, boosting and bagging methods, rule-based systems, or artificial neural networks.

For example, an SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. An SVM classifier utilizes a user-specified kernel function to organize training data within a defined feature space. In the most basic implementation, the kernel function can be a radial basis function, although the systems and methods described herein can utilize any of a number of linear or non-linear kernel functions.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier.

The classical ANN classifier is fully-connected and feed-forward. Convolutional neural networks, however, includes convolutional layers in which nodes from a previous layer are only connected to a subset of the nodes in the convolutional layer. Recurrent neural networks are a class of neural networks in which connections between nodes form a directed graph along a temporal sequence. Unlike a feed-forward network, recurrent neural networks can incorporate feedback from states caused by earlier inputs, such that an output of the recurrent neural network for a given input can be a function of not only the input but one or more previous inputs. As an example, Long Short-Term Memory (LSTM) networks are a modified version of recurrent neural networks, which makes it easier to remember past data in memory.

A k-nearest neighbor model populates a feature space with labelled training samples, represented as feature vectors in the feature space. In a classifier model, the training samples are labelled with their associated class, and in a regression model, the training samples are labelled with a value for the dependent variable in the regression. When a new feature vector is provided, a distance metric between the new feature vector and at least a subset of the feature vectors representing the labelled training samples is generated. The labelled training samples are then ranked according to the distance of their feature vectors from the new feature vector, and a number, k, of training samples having the smallest distance from the new feature vector are selected as the nearest neighbors to the new feature vector.

In one example of a classifier model, the class represented by the most labelled training samples in the k nearest neighbors is selected as the class for the new feature vector. In another example, each of the nearest neighbors can be represented by a weight assigned according to their distance from the new feature vector, with the class having the largest aggregate weight assigned to the new feature vector. In a regression model, the dependent variable for the new feature vector can be assigned as the average (e.g., arithmetic mean) of the dependent variables for the k nearest neighbors. As with the classification, this average can be a weighted average using weights assigned according to the distance of the nearest neighbors from the new feature vector. It will be appreciated that k is a metaparameter of the model that is selected according to the specific implementation. The distance metric used to select the nearest neighbors can include a Euclidean distance, a Manhattan distance, or a Mahalanobis distance.

A regression model applies a set of weights to various functions of the extracted features, most commonly linear functions, to provide a continuous result. In general, regression features can be categorical, represented, for example, as zero or one, or continuous. In a logistic regression, the output of the model represents the log odds that the source of the extracted features is a member of a given class. In a binary classification task, these log odds can be used directly as a confidence value for class membership or converted via the logistic function to a probability of class membership given the extracted features.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used, but a continuous parameter can be computed according to a number of decision trees that select a given task.

Alternatively, the image evaluation component 106 can determine the metric representing the quality of each UWFA image using an appropriate property of the vascular structure map, and it will be appreciated that the method used to generate the quality metric can vary according to the process used for segmenting the vascular structure map. In one example, a total vascular area of the vascular structure map can be used. In another example, the parameter can be derived from the segmentation process itself, for example, as a confidence value derived from the output of a neural network segmentation or other segmentation process, a minimum energy from a deformable model/energy minimization technique, or a similar parameter. In still another example, a metric representing a similarity of the vascular structure map to a representative vascular structure map, such as previously acquired image or other model vasculature, can be used. In this instance, each image can be registered to the representative image, and a metric such as a number of pixels having different values across the vascular structure map, an area of a difference image representing the two maps, a Dice similarity metric, or a Jaccard similarity metric. It will be appreciated that different parameters can be used for generating the metric for the early phase images and the late phase images.

In one implementation, the metric for the early phase images is generated from the total area of the vascular structure map, and the metric for the late phase images is generated according to a similarity of the vascular structure map of each image to that of a selected image from the early phase. Accurately detecting changes in small blood vessels is critical when dealing with diseases that result in microvascular abnormalities, such as diabetic retinopathy, and a peak in retinal detection has been found within the first minute of injection. Approximately two minutes after dye injection, detected vessel areas change only minimally as the background fluorescein increased with the dye perfusion. Increased background brightness decreases the contrast and interferes with the detection of small vessels. Accordingly, the inventors have found the optimal timeframe to measure vascular change to be within the first minute after injection. Similarly, frames captured later than two minutes after injection may not be appropriate for non-perfusion analysis because of the increased background fluorescence. Comparison of later images with the selected images from the early phase allows for identification of images that have artifacts or anomalous FOVs, since obstructions or changes in FOV result in significant changes in detected vascular area.

The image selector 108 selects a set of one or more images from each of the early phase and the late phase according to the metric determined for each image. The image selector 108 can select, for each phase, one or more images having the highest or the lowest values for the metric, depending on how the metric is assigned. The images selected for each phase can then be displayed to a user at an associated display (not shown) via a user interface 110. This automated image selection process of the illustrated system 100 saves significant time in image analysis and eliminates subjectivity. It has the potential for multi-level improvements to clinical workflow and automated systems for image interpretation.

Figure 2:
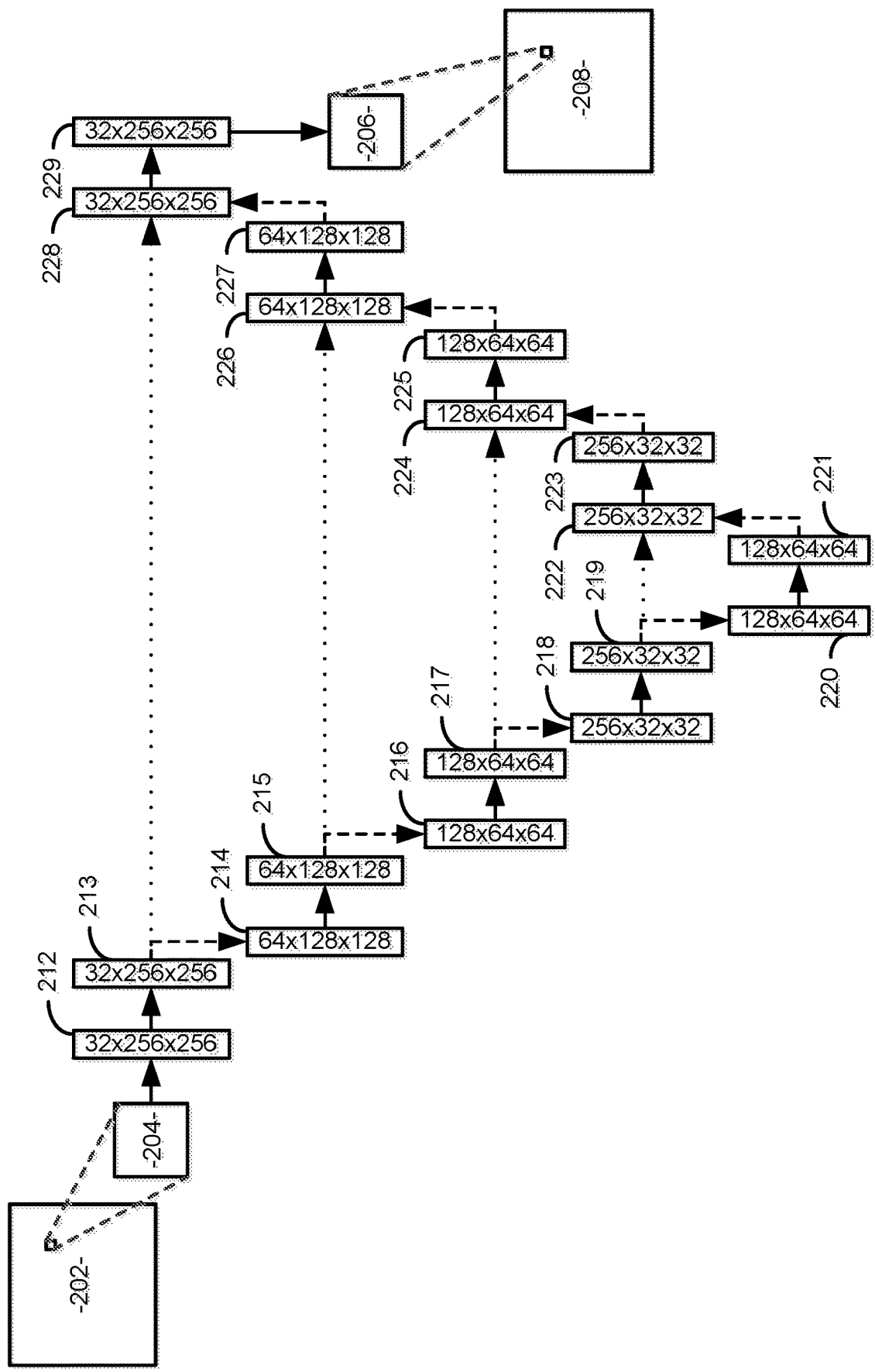
FIG. 2 illustrates a functional block diagram of another example of a system for automated selection of ultra-widefield angiography images.

FIG. 2 illustrates one implementation of a segmentation platform 200 that can be used in the system of FIG. 1. The illustrated segmentation platform uses a deep learning convolutional architecture to reduce a patch 202 from a greyscale image 204 into a corresponding portion 206 of a segmented mask 208 representing the image. In the illustrated example, the system 200 evaluates uses a 256×256 pixel patch 202 and uses a twelve-by-twelve kernel in convolutions between layers 212-229. This kernel size allows for more contextual information, and the inventors have found to improve performance. In the image, convolutional layer dimensions are expressed as an ordered triplet representing the dimensions of the array being passed on to the next layer, with the first number of the triplet representing the number of feature layers that have been generated, while the second two numbers indicate the resolution to which the image has been reduced.

Solid lines represent application of a convolutional kernel between two layers. Dotted lines represent concatenation processes, in which matrices from earlier into the model with less processed information are appended to matrices of identical dimensions that have been more thoroughly processed, allowing the model to consider both higher and lower-level information when making judgements. Pooling is a computationally efficient way of selecting the most important information in an area and passing it along in a condensed form. In a pooling arrangement, the dimensionality of the data is reduced by selecting a representative value for each of a plurality of regions within the data. In the illustrated implementation, the pooling uses a two-by-two window with a stride of two and selects a maximum value within each region. This process, referred to as "max pooling," is represented by a dashed line in FIG. 2. An "upsampling" process applies a two-by-two kernel to each layer to decrease the depth, or number of feature layers, and increase the resolution of each layer. Like the pooling process, upsampling is represented by dashed lines.

The illustrated convolutional deep learning model was trained using manual annotations of vasculature, developed from UWFA frames with various pathologies, including non-perfusion, leakage and neovascularization. Annotators were encouraged to change the contrast to compensate for variable background fluorescence, and sections with low confidence of segmentation were omitted to have a highly accurate ground truth. Early generation vessel masks created with conventional algorithms were used as an initial template for manual segmentation to facilitate efficiency and prevent annotator fatigue. Once the annotated training samples were provided, an appropriate training method, such as backpropagation, was applied to train the network.

Figure 3:
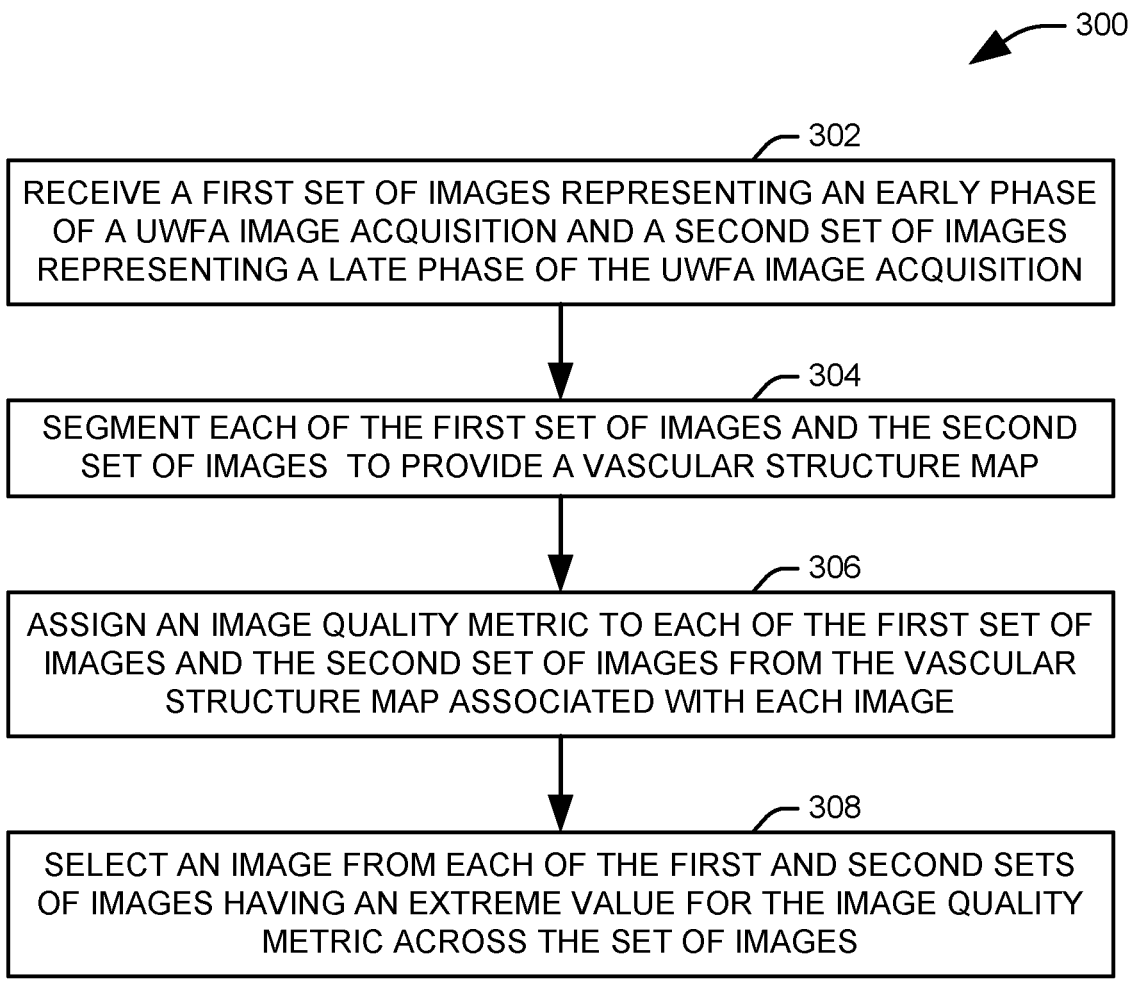
FIG. 3 illustrates one example of a method for automated selection of ultra-widefield angiography images.
Figure 4:
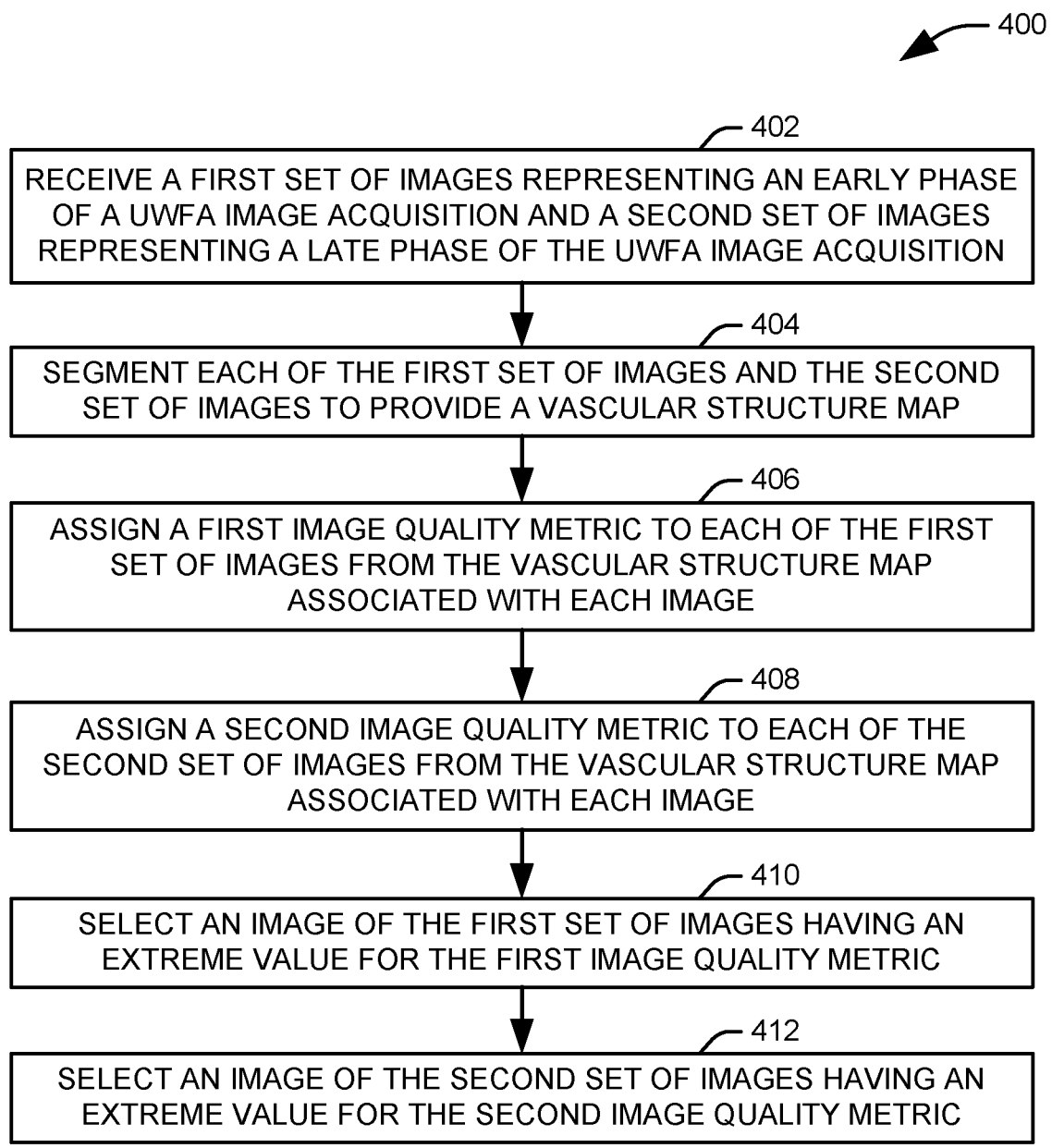
FIG. 4 illustrates another example of a method automated selection of ultra-widefield angiography images.

In view of the foregoing features described above, example methods will be better appreciated with reference to FIGS. 3 and 4. While, for purposes of simplicity of explanation, the method is shown and described as executing serially, it is to be understood and appreciated that the method is not limited by the illustrated order, as parts of the method could occur in different orders and/or concurrently from that shown and described herein.

FIG. 3 illustrates one example of a method 300 for automated selection of UWFA images. At 302, a first set of images representing an early phase of a UWFA image acquisition and a second set of images representing a late phase of the UWFA image acquisition are received. For example, the images can be retrieved from a non-transitory storage medium or received directly from a UWFA imaging system via a network interface or a local bus. At 304, each of the first set of images and the second set of images are segmented to provide a vascular structure map. In one example, each of the first set of images and the second set of images are provided to a convolutional neural network trained on a set of UWFA images segmented by a human expert to provide the vascular structure map.

At 306, an image quality metric is assigned to each of the first set of images and the second set of images from the vascular structure map associated with each image. At 308, an image from each set of images having an extreme value for the image quality metric across the set of images is selected. In one implementation, each of the first set of images and the second set of images to a predictive model, trained on a plurality of annotated vascular structure maps. In one implementation, a same image quality metric is used for each set of images. In another implementation, the first image quality metric is calculated differently from the second image quality metric such that a value of the first image quality metric for a given image is different from a value of the second image quality metric for the given image. For example, a first image quality metric, associated with the first set of images, can be determined as a total area of the vascular structure map for the image or a function of the total area. In this implementation, the image having the maximum value of the total area of the vascular structure map is selected. Similarly, a second image quality metric for each image of the second set of images can be determined according to a similarity of the vascular structure map to a representative vascular structure map, such as the selected image from the first set of images. The selected images can then be displayed to a user or stored on a non-transitory computer readable medium for later retrieval and display.

FIG. 4 illustrates another example of a method 400 for automated selection of UWFA images. At 402, a first set of images representing an early phase of a UWFA image acquisition and a second set of images representing a late phase of the UWFA image acquisition are received. At 404, the received images are segmented to provide a vascular structure map for each of the first set of images and the second set of images. At 406, a first image quality metric is assigned to each of the first set of images from the vascular structure map associated with each image. In one implementation, the first image quality metric is a function of a total area of the vascular structure map for the image.

At 408, a second image quality metric is assigned to each of the second set of images from the vascular structure map associated with each image. The first image quality metric is calculated differently from the second image quality metric, such that a value of the first image quality metric for a given image is different from a value of the second image quality metric for the given image. In one implementation, the second image quality metric represents a similarity of the vascular structure map to a representative vascular structure map. At 410, an image of the first set of images having an extreme value for the image quality metric across the first set of images is selected. It will be appreciated that the extreme value can be a minimum or maximum, depending on how the metric is calculated. At 412, an image of the second set of images having an extreme value for the image quality metric across the second set of images is selected. The selected images can then be displayed to a user or stored on a non-transitory computer readable medium for later retrieval and display.

Figure 5:
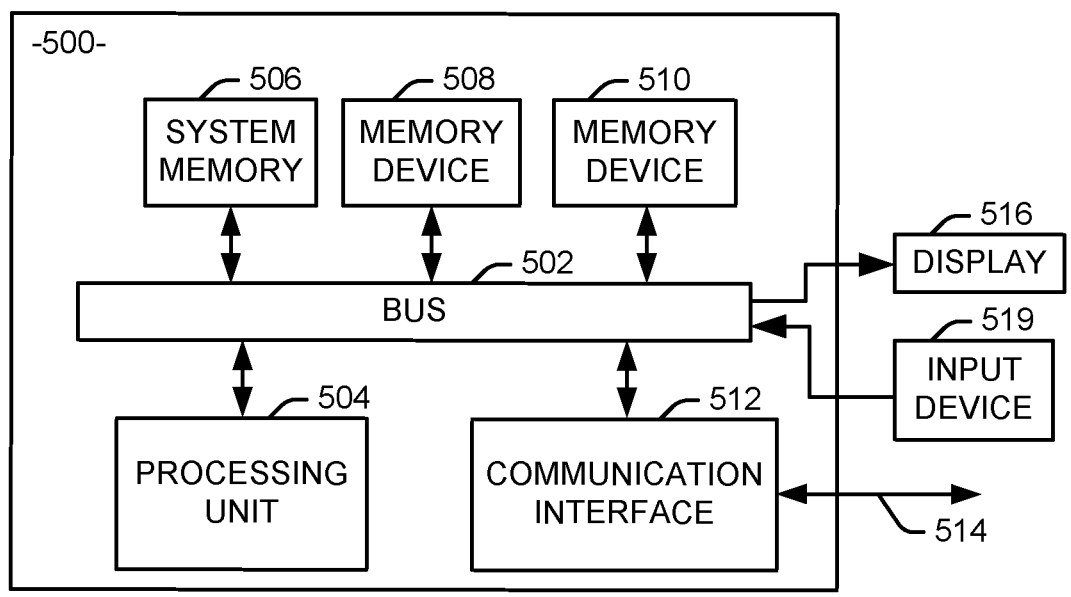
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 500 of hardware components capable of implementing examples of the systems and methods disclosed herein. The system 500 can include various systems and subsystems. The system 500 can be a personal computer, a laptop computer, a workstation, a computer system, an appliance, an application-specific integrated circuit (ASIC), a server, a server BladeCenter, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard, touch screen, and/or a mouse). The system bus 502 can be in communication with the processing unit 504 and the system memory 506. The additional memory devices 508 and 510, such as a hard disk drive, server, standalone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that may be needed to operate a computer. The memories 506, 508 and 510 can be implemented as computer-readable media (integrated or removable), such as a memory card, disk drive, compact disk (CD), or server accessible over a network. In certain examples, the memories 506, 508 and 510 can comprise text, images, video, and/or audio, portions of which can be available in formats comprehensible to human beings. Additionally or alternatively, the system 500 can access an external data source or query source through the communication interface 512, which can communicate with the system bus 502 and the communication link 514.

In operation, the system 500 can be used to implement one or more parts of a system, such as that illustrated in FIG. 1. Computer executable logic for implementing the system resides on one or more of the system memory 506, and the memory devices 508 and 510 in accordance with certain examples. The processing unit 504 executes one or more computer executable instructions originating from the system memory 506 and the memory devices 508 and 510. The term "computer readable medium" as used herein refers to a medium that participates in providing instructions to the processing unit 504 for execution. This medium may be distributed across multiple discrete assemblies all operatively connected to a common processor or set of related processors.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for automated selection of ultra-widefield angiographic (UWFA) images, the system comprising:
a processor; and
a non-transitory computer readable medium storing executable instructions, the executable instructions comprising:
an imager interface that receives a first set of images representing an early phase of a UWFA image acquisition and a second set of images representing a late phase of the UWFA image acquisition;
a segmentation component that segments each of the first set of images and the second set of images to provide a vascular structure map for each of the first set of images and the second set of images;
an image evaluation component that assigns an image quality metric to each of the first set of images and the second set of images from the vascular structure map associated with each image; and
an image selector that selects an image of the first set of images having an extreme value for the image quality metric across the first set of images and an image of the second set of images having an extreme value for the image quality metric across the second set of images.

2. The system of claim 1, wherein the segmentation component comprises a a convolutional neural network trained on a set of UWFA images segmented by a human expert.

3. The system of claim 2, wherein the convolutional neural network uses a twelve-by-twelve convolutional kernel.

4. The system of claim 1, wherein the image selector assigns a first image quality metric to each of the first set of images and assigns a second image quality metric to each of the second set of images, wherein the first image quality metric is calculated differently from the second image quality metric such that a value of the first image quality metric for a given image is different from a value of the second image quality metric for the given image.

5. The system of claim 1, wherein the image selector assigns the image quality metric to each of the first set of images according to a total area of the vascular structure map for the image.

6. The system of claim 1, wherein the image selector comprises a predictive model, trained on a plurality of annotated vascular structure maps, that assigns the image quality metric to each of the first set of images based on the vascular structure maps associated with the first set of images.

7. The system of claim 6, wherein the predictive model assigns the image quality metric to each of the first set of images and the second set of images.

8. The system of claim 6, wherein the image selector comprises a predictive model, trained on a set of feature values extracted from a plurality of annotated vascular structure maps, that assigns the image quality metric to each of the first set of images on a corresponding set of features extracted from the vascular structure maps associated with the first set of images.

9. The system of claim 1, wherein the image selector assigns an image quality metric to each of the second set of images according to a similarity of the vascular structure map to a representative vascular structure map.

10. The system of claim 9, wherein the given image is an image of the second set of images, and the representative vascular structure map is the vascular structure map associated with the image of the first set of images having the extreme value.

11. A method for automated selection of ultra-widefield angiographic (UWFA) images comprising:
- receiving a first set of images representing an early phase of a UWFA image acquisition and a second set of images representing a late phase of the UWFA image acquisition;
- segmenting each of the first set of images and the second set of images to provide a vascular structure map for each of the first set of images and the second set of images;
- assigning an image quality metric to each of the first set of images and the second set of images from the vascular structure map associated with each image;
- selecting an image of the first set of images having an extreme value for the image quality metric across the first set of images; and
- selecting an image of the second set of images having an extreme value for the image quality metric across the second set of images.

12. The method of claim 11, wherein segmenting each of the first set of images and the second set of images comprises providing each of the first set of images and the second set of images to a convolutional neural network trained on a set of UWFA images segmented by a human expert.

13. The method of claim 11, wherein assigning the image quality metric to each of the first set of images and the second set of images comprises:
- assigning a first image quality metric to each of the first set of images; and
- assigning a second image quality metric to each of the second set of images, wherein the first image quality metric is calculated differently from the second image quality metric such that a value of the first image quality metric for a given image is different from a value of the second image quality metric for the given image.

14. The method of claim 13, wherein assigning the image quality metric to each of the first set of images and the second set of images from the vascular structure map associated with each image comprises assigning the image quality metric for each image of the first set of images according to a total area of the vascular structure map for the image.

15. The method of claim 14, wherein selecting the image of the first set of images having the extreme value for the image quality metric across the first set of images comprises selectin the image of the first set of images having the maximum value of the total area of the vascular structure map.

16. The method of claim 14, wherein assigning an image quality metric to each of the first set of images and the second set of images from the vascular structure map associated with each image comprises assigning the image quality metric for each image of the second set of images according to a similarity of the vascular structure map to a representative vascular structure map.

17. The method of claim 16, wherein the representative vascular structure map is the vascular structure map associated with the image of the first set of images having the extreme value.

18. A method for automated selection of ultra-widefield angiographic (UWFA) images comprising:
- receiving a first set of images representing an early phase of a UWFA image acquisition and a second set of images representing a late phase of the UWFA image acquisition;
- segmenting each of the first set of images and the second set of images to provide a vascular structure map for each of the first set of images and the second set of images;
- assigning a first image quality metric to each of the first set of images from the vascular structure map associated with each image;
- assigning a second image quality metric to each of the second set of images from the vascular structure map associated with each image, wherein the first image quality metric is calculated differently from the second image quality metric such that a value of the first image quality metric for a given image is different from a value of the second image quality metric for the given image;
- selecting an image of the first set of images having an extreme value for the first image quality metric across the first set of images; and
- selecting an image of the second set of images having an extreme value for the second image quality metric across the second set of images.

19. The method of claim 18, wherein assigning the first image quality metric to each of the first set of images comprises assigning the first image quality metric for each image of the first set of images according to a total area of the vascular structure map for the image.

20. The method of claim 18, wherein assigning a second image quality metric to each of the second set of images from the vascular structure map associated with each image comprises assigning the second image quality metric for each image of the second set of images according to a similarity of the vascular structure map to a representative vascular structure map.

* * * * *